United States Patent [19]
Leger et al.

[11] 3,819,387
[45] June 25, 1974

[54] HEAT DEVITRIFIABLE GLASS
[75] Inventors: Lucien Leger, Montigny-Le Tilleul; Jules Bray, Roux, both of Belgium
[73] Assignee: Glaverbel S.A., Watermael-Boitsfort, Belgium
[22] Filed: Jan. 20, 1972
[21] Appl. No.: 219,511

Related U.S. Application Data
[63] Continuation of Ser. No. 853,528, Aug. 27, 1969, abandoned, which is a continuation-in-part of Ser. No. 558,602, June 20, 1966, abandoned.

[30] Foreign Application Priority Data
June 25, 1965  Luxembourg ........................... 48911

[52] U.S. Cl. .................... 106/39.6, 51/308, 65/33, 65/21, 106/39.8, 106/51, 106/52
[51] Int. Cl. ............................................. C03c 3/22
[58] Field of Search ...... 106/39 DV, 52, 51; 51/308

[56] References Cited
UNITED STATES PATENTS
| | | | |
|---|---|---|---|
| 2,920,971 | 1/1960 | Stookey | 106/39 DV |
| 2,961,328 | 11/1960 | Babcock | 106/52 |
| 3,183,071 | 5/1965 | Rue et al. | 51/308 X |

FOREIGN PATENTS OR APPLICATIONS
| | | | |
|---|---|---|---|
| 986,289 | 3/1965 | Great Britain | 106/39 DV |
| 1,099,135 | 2/1961 | Germany | 106/39 DV |
| 1,029,154 | 5/1966 | Great Britain | 106/39 DV |
| 833,975 | 5/1960 | Great Britain | 106/39 |

OTHER PUBLICATIONS
Glass Industry, "Recent Translations of Russion Papers of Interest to the Glass Industry", May 1958, p. 275.

*Primary Examiner*—Helen M. McCarthy
*Attorney, Agent, or Firm*—Spencer & Kaye

[57] ABSTRACT

Heat-devitrified glass having high mechanical strength and extremely well-suited for ballotini is prepared from inexpensive constituents, such as sand, alumina or feldspar, dolomite and limestone.

The composition from which the heat-devitrified glass is prepared is virtually free from lithium oxide and, per 100 parts by weight, consists essentially of from 44 to 66 parts by weight of $SiO_2$, from 13 to 21 parts by weight $Al_2O_3$, from four to nine and six tenths parts by weight of CaO and from five to 15 parts by weight of MgO; the sum of the parts by weight of $SiO_2$, $Al_2O_3$, CaO and MgO being at least 80; the ratio of the parts by weight of $SiO_2$ to the parts by weight of $Al_2O_3$ being from 3.1 to 3.5:1; the ratio of the sum of the parts by weight of $SiO_2$ and $Al_2O_3$ to the sum of the parts by weight of CaO and MgO being from 2.3:1 to 4:1; and any further ingredient, in the amount thereof present, constitutes means for permitting devitrification by heat of glass of the composition.

11 Claims, No Drawings

HEAT DEVITRIFIABLE GLASS

CROSS REFERENCE TO RELATED APPLICATION

This application is a continuation of application Ser. No. 853,528, filed Aug. 27, 1969 and itself a continuation-in-part application of application Ser. No. 558,602, filed June 20, 1966, both now abandoned.

BACKGROUND OF THE INVENTION

The highly desirable properties of glasses that can be devitrified by heating are well known. Such glasses have high mechanical strength and are extremely well suited in bead form, e.g., for being blasted onto metal and other surfaces for cold-working, surface cleaning or finishing purposes. However, prior glass compositions capable of being devitrified by heating have depended for this property on a high proportion of lithium oxide, a relatively expensive material. Therefore, until the present invention, it had not been possible to produce a glass which is easily devitrified by heating and yet which is composed of normal constituents of an inexpensive vitrifiable batch.

Devitrified compositions fabricated from metallurgical slags contain such a large amount of impurities that they have a disagreeable greyish hue which, even with the addition of coloring agents, results in products having a dirty or soiled appearance.

SUMMARY OF THE INVENTION

The present invention relates to glass compositions and, more particularly, to glass compositions which can be devitrified by heat treatment, as well as the resulting devitrified products. Such glass is produced from normal constituents (without necessitating the use of expensive ingredients) of a vitrifiable batch by employing silica, alumina, calcium oxide and magnesium oxide. Thus, mixtures of these four selected oxides are susceptible to being devitrified by appropriate thermal treatment even without a nucleating agent, but the latter may be incorporated therein. According to this invention compact objects, e.g., plates and dishware, are formed and devitrified in a uniform manner throughout their respective masses. Compositions which exclude slags are employed to obtain pure white products or, by the addition of colorants, a complete range of pure tints.

A principal object of the present invention is to provide a glass composition which is capable of being devitrified by heating and yet obviates the need for expensive prior art materials.

It is a further object of the present invention to provide a glass composition which is devitrified by heating, comprises the normal constituents of an inexpensive vitrifiable batch and has high mechanical strength.

A still further object of the present invention is to provide a heat devitrifiable glass composition which comprises silica, alumina, calcium oxide and magnesium oxide.

Yet a further object of the present invention is to provide a process for producing a heat devitrified glass comprising silica, alumina, calcium oxide and magnesium oxide.

Another object of the present invention is to provide glass beads, particularly small spherical glass beads known as "Ballotini," from heat devitrified glass comprising silica, alumina, calcium oxide and magnesium oxide.

Still futher objects and advantages of the process and product of the present invention will become more apparent from the following more detailed description of the invention.

DEFINITIONS

Softening temperature ("softening point" or "$P_{soft}$") according to AST-C338 is that temperature at which a glass filament of 235 mm in length and a diameter of from 0.55 to 0.75 mm is lengthened about 1 mm/minute (min) when heated over a length of 100 mm at a rate of 5°C/min. Since the stated rate of heating produces substantial devitrification of the subject products and thus prevents softening, the rate of heating (for determinations in this disclosure) is increased to 25°C/min, but the definition is otherwise unchanged. (The true "softening point" is generally recognized as being that temperature at which the viscosity is $10^{7.6}$ poises, but the preceding definition is used throughout the subject disclosure.)

The liquidus temperature (viscosity = $10^{2.5}$ poises) is a constant for any specific composition of glass, whether or not the glass is devitrified and regardless of the types and proportions of crystalline phases existing therein. It is the minimum temperature at which (under uniform heating conditions) no crystal can remain. The liquidus temperature provides a basis for comparing melting temperatures for different mixtures of starting materials. In practice, homogeneous mixtures of starting materials melt at around 100° to 150°C above their respective liquidus temperatures.

The Knoop hardness is obtained by dividing the applied load-expressed in kilograms-force — on a diamond based pyramidal diamond indenter, by the unrecovered projected area of the indentation in square millimeters in the test specimen. The load applied in the measurements was 100 grams. The indenter remained in contact with the sample for thirty seconds. The form of the indenter was as given in the N.B.S. specification (Small, Louis, "Hardness Theory and Practice" — Part I: Practice — pages 241–243, Service Diamond Tool Company, Ann Arbor, 1960).

DETAILS

The present invention, broadly defined, resides in glass compositions which comprise the following constituents in the stated percentages by weight:

$SiO_2$ — 44 to 66 percent
$Al_2O_3$ — 13 to 21 percent (preferably 14 to 18 percent)
CaO — 4 to 9.6 percent
MgO — 5 to 15 percent (preferably 13 to 15 percent)

alone, or together with up to 20 percent by weight of another ingredient, or ingredients, which do not render the glass incapable of being devitrified by heat treatment. Such compositions exclude any lithium oxide except that which may be present as an impurity. A larger proportion of lithium oxide is troublesome as it gives rise to a phase having less mechanical resistance.

The $SiO_2$, $Al_2O_3$, CaO and MgO together thus constitute at least 80 percent (preferably at least 95 percent) and up to 100 percent by weight of the total glass composition, the ratio of the $SiO_2$ content to the $Al_2O_3$ content is from 3:1 to 3.5:1, and the ratio of the sum of the $SiO_2$ and $Al_2O_3$ contents to the sum of the CaO and MgO contents is from 2.3:1 to 4:1. Examples of other ingredients which may be present are various nucleating agents, such as those hereinafter specified and $Na_2O$ and $K_2O$ either or both of which oxides may be present in an amount or aggregate amount of not more than 10 percent by weight.

When the ratio $SiO_2/Al_2O_3$ is outside of the range from 3:1 to 3.5:1, excess phases of cristobalite (ratio in excess of 3.5:1 and alumina (ratio less than 3:1), which are poorly adherent to the rest of the product, form, thus materially diminishing mechanical resistance.

When the ratio $(SiO_2 + Al_2O_3)/(CaO + MgO)$ is outside of the range 1.5:1 to 4:1 (in practice from 2.3:1 to 4:1), the products are, respectively, easily attacked by water and certain acids (ratio less than 1.5) and are very difficult to melt in a homogeneous manner (ratio greater than 4).

Beads formed from the glasses of the present invention have considerable mechanical strength, and by subjecting them to heat treatment, as will hereafter be explained, the glass can be devitrified. Beads composed of devitrified glass, thus produced, have high mechanical strength and are suitable for being blasted onto metal and other surfaces for cold-working or surface cleaning or finishing purposes. Such beads, which may, e.g., be in the size range from some tens of microns ($\mu$) up to 7 or 8 mm, are produced more cheaply than has hitherto been possible, not only because the devitrification is carried out merely by a heat treatment of the glass and does not necessitate specialized techniques, such as exposure of the glass to ultra-violet or short wave radiation, but also because the glass itself is formed entirely from the normal constituents of a cheap, vitrifiable batch, viz: sand, alumina or feldspar, dolomite and limestone. Ballotini of devitrified glass according to this invention have particularly high mechanical strength.

The alumina in the glass serves as a network-former and appreciably contributes to the mechanical strength of the glass; on the other hand, however, it tends to make the glass less fusible. The calcium and magnesium oxides are lattice modifiers; they influence the nature of the crystals which form under heat treatment and thus the mechanical strength of the devitrified glass. These properties tend to improve with increase in the proportion of magnesium oxide present but the above-defined glass compositions contain sufficient calcium oxide for achieving requisite properties as regards fusibility and homogeneity.

During heat treatment of the glasses of the present invention, a separation of phases occurs in the glass while it is above its softening point, and the interfaces serve as crystallization catalysts.

The rate of devitrification can be accelerated by incorporating at least one appropriate nucleation agent, which, under the heat treatment, forms nuclei which catalyze the crystallization. A very suitable nucleation agent is $TiO_2$ which may be used in a proportion of from 3 to 15 percent (preferably from 4 to 15 percent) by weight. Titanium dioxide serves normally as a lattice-former and assists the action of the other lattice formers viz: silica and alumina. However, if the proportion of titanium dioxide is too high, it acts as a lattice modifier and has an effect similar to that of calcium amd magnesium oxides. At the same time titanium dioxide (whether or not it is involved in a crystalline phase) aids nucleation and subsequent devitrification of the glass matrix.

An alternative very suitable nucleating agent is $Cr_2O_3$ which may be used in a proportion of from 0.5 to 5 percent by weight. It is not known if the chromium, when $Cr_2O_3$ is used within these limits, in glasses of the compositions indicated earlier, acts as lattice-modifier or lattice-former, or if the oxide remains in a finely dispersed crystalline form. But as a matter of fact the presence of $Cr_2O_3$ favours devitrification of said glass compositions.

TABLE A

| Glass composition No. | 1 | (2) | 3 | 4 | 5 | (6) | (7) | 8 | 9 | (10) | 11 | 12 | 13 | 14 | 15 |
|---|---|---|---|---|---|---|---|---|---|---|---|---|---|---|---|
| $SiO_2$ | 45.3 | 51 | 51 | 51 | 51 | 51 | 56 | 56 | 56 | 56 | 60 | 59.6 | 59.6 | 56.3 | 62 |
| $Al_2O_3$ | 15.1 | 17 | 17 | 17 | 17 | 17 | 16 | 16 | 16 | 16 | 20 | 17.3 | 17.3 | 16.4 | 18 |
| CaO | 9.6 | 3 | 4 | 7 | 9.6 | 10 | 3 | 4 | 9.5 | 18 | 7 | 9.6 | 4.8 | 9.1 | 5 |
| MgO | 15 | 15 | 14 | 14 | 8.4 | 8 | 15 | 14 | 14 | 9 | 13 | 9.6 | 14.4 | 9.1 | 15 |
| $Na_2O$ |  | 10 | 10 | 7 | 5 | 7 | 10 | 10 | 4.5 | 1 |  |  |  |  |  |
| $K_2O$ | 10 |  |  |  | 5 | 3 |  |  |  |  |  |  |  |  |  |
| $TiO_2$ |  | 4 | 4 | 4 | 4 | 4 |  |  |  |  |  | 3.9 | 3.9 | 9.1 |  |
| $Cr_2O_3$ | 5 |  |  |  |  |  |  |  |  |  |  |  |  |  |  |
| I | 1280 | 700 | 1300 | 1280 | 1270 | 650 | 750 | 1250 | 1250 |  |  | 1280 | 1280 | 1270 | 1250 |
| II | 1200 | 1300 |  |  | 1200 | 1250 | 1500 |  |  | 1225 | 1150 | 1130 | 1200 | 1225 | 1180 |
| III | 4.1 | 6.5 | 4.15 | 4.15 | 4.15 | 6.8 | 7.1 |  | 4.1 | 6.8 | 4.1 | 4.1 |  |  | 4.1 |

Table A provides a comparison of compositions of various devitrified glasses according to the present invention with others (the numbers of which are in parentheses) having a CaO content outside of the range of from 4 to 9.6 parts by weight per 100 parts by weight of the total composition. Fifteen compositions of devitrified glasses are characterized by weight percentages of components, followed by I [Knoop hardness (a function of the size of the crystals and other variables, such as the percentage of vitreous matrix and type of crystalline phases formed, each the result of the thermal treatment utilized) obtained on glass plates 10 centimeters (cm) on each side and 5 millimeters (mm) thick and prepared according to the thermal treatment of Example II], II [Temperature (°C) at which the rate of crystal growth is maximum] and III [Linear coefficient of expansion $\times 10^6$ (per °C in the temperature range from 100° to 200°C)]. The criticality of the lower and upper limits of the range of CaO content are clearly illustrated by both the Knoop hardness and the coefficient of expansion.

As a nucleating agent $TiO_2$ is employed in compositions 2 to 6 and 12 to 14 and $Cr_2O_3$ is employed in composition 1.

Glasses having the above compositions, and other glasses according to the present invention, after being formed into an article, e.g., a glass bottle or a continuous ribbon, of desired shape, are devitrified, e.g., by a heat treatment. By way of example with respect to glass beads the preferred treatment, which causes very small non-oriented crystals, strongly imbricated one into another, to form through the whole mass of glass composing each bead, comprises heating the beads in two stages. In the first stage, the beads are heated in a suitable enclosed space to increase their temperature progressively up to a level approaching the glass softening point, and then their temperature is stabilized and maintained for some time. The crystallization commences and thus the glass begins to solidify before the second heating stage commences, and both the rate at which the temperature is increased during the first-stage heat treatment and the length of time for which the beads are maintained at the temperature to which they are raised in this stage are influential factors. In general, the rate of temperature increase is less than 10°C, e.g. from 0.5° to 10°C, per minute, the appropriate rate in each case depending on the composition of the glass. The highest temperature reached may be required to be maintained for a period of from a few minutes to 2 or 3 hours, again depending on the glass composition. In this way, the number of crystals is increased and the crystal size is reduced. When a constant temperature is maintained for 3 hours following the first heating stage, the average crystal dimension does not exceed 10 microns.

In some cases, a slow progressive increase in temperature up to a value somewhat below the glass softening temperature suffices to initiate the crystallization. In such case, it is not necessary to stabilize the temperature for a period before the second-stage heating commences. As the final temperature reached in the first heating stage is below the softening point of the glass, there is no risk of the glass becoming deformed in the course of this heating. The increase in temperature in the first step and the duration of maintaining the temperature at the first level (if used) is sufficiently long to avoid any danger of softening during the second heating stage or at the second constant level (if provided).

In the second heating stage, the beads, which have begun to crystallize are, while remaining in the enclosed space, further heated so that their temperature progressively increases more slowly than in the first stage, to a level above the glass softening point but within 100°C of and below that at which the rate of crystal growth is maximum. Then the temperature is stabilized and maintained for some time. According to the glass composition, the rate at which the temperature is increased in the second stage is, in general, less than 5°C, e.g. from 0.5° to 5°C, per minute, and the period of time for which the final temperature reached is maintained is from a few minutes to 1 hour, approximately. Homogeneous crystaline and vitreous phases are assured by the indicated lower rate of temperature increase in the second heating stage. Moreover, maintaining the final temperature of the second heating stage for about 1 hour leads to certain readjustments in structure so that, at the time of cooling, there is less tendency for the development of unfavorable traction forces in the product.

By the second-stage heat treatment, the crystallization and the final solidification in the whole mass of the glass are nearly completed. Although the temperature in the second heating stage rises above the glass softening point, it has been found that, if the heat treatment is suitably regulated, the glass beads do not become deformed. The normal effect of the heating on the viscosity is offset by the solidification involved in devitrification. Steps can be taken, however, to prevent the beads from agglomerating. Agglomeration is prevented in a variety of ways. A good way is to heat the beads while they are distributed in a powder, e.g. powdered carbon, which is not wettable by the glass and which is not fused at the temperature reached, or to heat solidified beads while they are suspended or entrained in a stream of inert gas. (When powder is employed, it exerts a real separation or disagglomeration effect of one bead from the other and can be integrally recuperated after the end of the treatment). Following the second stage of the heat treatment, the beads of devitrified glass are cooled. The cooling is controlled until the beads are at a temperature slightly below the softening point of the glass. Then cooling is completed by exposing the beads to ambient air. The controlled cooling preferably keeps the rate of decrease of temperature to about 20°C per minute.

Glass beads can for example be suspended in an heated atmosphere of nitrogen, blown in a vertical direction in order to suspend said beads. At the same time an horizontal component of movement is given to the gas, and thus to the beads; in this way the beads pass successively into zones which are heated, for example by radiation, to the desired temperatures, and which zones have lengths corresponding to the time for which the beads have to be maintained at such temperature.

Disregarding the crystalline phases of any nucleating agent which may be present, the devitrified glasses may contain one or more of the following main crystalline phases: Cristobalite $\alpha$ ($SiO_2$), Diopside ($CaO \cdot MgO \cdot 2SiO_2$), Anorthite ($CaO \cdot Al_2O_3 \cdot 2SiO_2$), Gellenite ($2CaO \cdot Al_2O_3 \cdot SiO_2$), Enstatite ($MgO \cdot SiO_2$). Crystallization caused by heat treatment as above described, is abundant, homogeneous, fine non-oriented and distributed through the whole mass. The crystal content is preferably higher than 50 percent or, better still, at least 55 percent by weight for the main purposes in view, particularly in the case of glass beads to be air-blasted against surfaces. The effect of variations in mode of devitrification is reflected in Table B with respect to composition 14 (Table A). Data presented are with respect to flat plates (5 mm in thickness), except for crushing resistance for which glass in bead form was employed.

To obtain results with glass No. 8 (Table A) comparable to those given in Table B under ($e$), the heating rate in the first step had to be brought to 5°C per minute and that in the second step, to 3°C per minute.

TABLE B.—GLASS NO. 14.—SOFTENING POINT BEFORE TREATMENT ACCORDING TO THE PROCESS: 780°C; TEMPERATURE OF MAXIMUM CRYSTAL GROWTH SPEED: 1225°C; LIQUIDUS TEMPERATURE: 1290°C

| Treatment | a | b | c | d | e | f |
|---|---|---|---|---|---|---|
| First step, °C/min. | 15 up to 700° 8 up to 770° | 0.5 up to 775° | 10 up to 775° | 10 up to 775° | 10 up to 775° | 10 up to 775°. |
| First level | None | None | None | None | 3 hours at 775° | 3 hours at 775° |
| Second step, °C/min. | 5 up to 1130° | 0.5 up to 1130° | 0.5 up to 1130° | 5 up to 1130° | 5 up to 1130° | 5 up to 1100°. |
| Second level | None | None | None | None | 1 hour at 1130° | 1 hour at 1100°. |
| Cooling, °C/min. | 20 down to 700° then in the open air. | 20 down to 700° then in the open air. | 20 down to 700° then in the open air. | 20 down to 700° then in the open air. | 10 down to 700° then in the open air. | 10 down to 700° then in the open air. |
| Average length of crystals, microns | 20 | 20 | 15 | 20 | 10 | 10. |
| Percent crystalline phase. | 65 | 70 | 60 | 60 | 75 | 50. |
| Knoop hardness kg/mm$^2$. | 1260 | 1350 | 1300 | 1280 | 1300 | 1280. |
| Resistance to deformation under load, kg/mm$^2$ | | 60 | | 55 | 70 | 55. |
| Resistance to crushing (when shaped into beads) kg/mm$^2$. | | 130 | | 120 | 140 | 110. |

Balls composed of devitrified glass of the compositions hereinbefore specifically enumerated, devitrification being accomplished by a heat treatment as above described, have been found to possess the following properties:

Resistance to deformation under load: above 30 kg/mm$^2$.
Resistance to crushing: of the order of 90 kg for a bead with a section of 1 mm$^2$ (diameter approximately 1.128 mm.)
Coefficient of linear thermal expansion: $4.1 \cdot 10^{-6}$/°C in the temperature range from 100° to 200°C.
Density: between 2.5 and 2.8 gr/cm$^3$.

Using identical thermal treatment, crystallization is effected in the form of very fine (average diameter in the order of from 10 to 20 $\mu$) crystals when the CaO content is from 4 to 9.6, whereas the average crystal diameter is not below 50 $\mu$ for otherwise comparable compositions having at least 10 percent by weight of CaO. Particle size is significant since mechanical resistance is improved (with essentially the same chemical composition) when crystals are fine and small. Thus, resistance to deformation under load varies from 35 to 40 kilograms (kg) per square millimeter (mm$^2$) for compositions having a CaO content of at least 10 percent by weight but exceeds 55 kg/mm$^2$ when the CaO concentration is from 4 to 9.6 percent by weight. In the same manner the resistance to crushing is between 110 and 120 kg/mm$^2$ for compositions having from 4 to 9.6 percent by weight of CaO, whereas said resistance does not exceed 95 kg/mm$^2$ for compositions having at least 10 percent by weight of CaO.

The coefficient of thermal expansion for the products of this invention, having a CaO content from 4 to 9.6 (inclusive) percent by weight, is essentially constant and equal to $4.1 \times 10^{-6}$ per °C in the temperature range of 100° to 200°C.

Maximum hardness is obtained in products having a CaO concentration between 4 and 9.6 percent by weight. Compositions haveing less than 4, or at least 10, percent by weight of CaO possess an average Knoop hardness (after devitrification) of at most about 800 kg/mm$^2$, whereas corresponding devitrified glass having from 4 to 9.6 percent by weight of CaO possesses a Knoop hardness of at least 1,250 kg/mm$^2$. (Before devitrification the latter glass has a Knoop hardness of the order of 650 kg/mm$^2$.) [All reported Knoop hardness figures are within ± 50 kg/mm$^2$.]

The range of CaO content between 4 and 9.6 percent by weight (of glass composition) is also critical with respect to fusibility as determined, e.g., by liquidus temperature. Such glass is more meltable than others, and this results in a technologically important advantage. Similar glasses (having about 56 percent by weight SiO$_2$, about 16 percent by weight Al$_2$O$_3$ and about 10 percent by weight MgO, i.e., formed on the basis of Example II but having in addition concentrations of CaO of 3, 4, 9.6 and 11 percent by weight have liquidus temperatures of 1,500°C, 1,300°C, 1,320°C and 1,450°C, respectively. The liquidus temperature increases rapidly as the CaO concentration is increased above 9.6 percent by weight.

Possessing a liquidus temperature below that of other glasses, moreover, does not result in glass which is deformable at a lower temperature when the glass is one according to the subject invention with a CaO content between 4 and 9.6 percent by weight. Said glass, after devitrification, can withstand (without deformation) higher temperatures than that supportable (without deformation) by glasses composed of different proportions of the same ingredients and by glasses composed of the same proportions of said ingredients but subjected to different thermal treatment. A comparison of:

a. Glass No. 3 (Table A) treated in accord with the procedure of Example II;

b. Glass No. 3 merely melted and then cooled to ambient temperature, i.e., without devitrification; and c. Glass No. 2 (Table A) treated in accord with the procedure of Example II; provides the following data:

| Glass | Liquidus Temperature (°C) | Softening Point (°C) |
|---|---|---|
| (a) | 1270 | 1030 |
| (b) | 1270 | 800 |
| (c) | 1410 | 950 |

The liquidus temperature of glass (c), which has a melting temperature of 1,520°C, is materially higher than that of glass according to the invention. Glass (a), treated according to the invention, has substantially greater resistance to softening than either (b) or (c).

In addition to devitrified glass balls the compositions of the subject invention are useful for the fabrication of other shaped objects, e.g., plates for use as wall or floor coverings, table tops (for example, laboratory tables), dishware, insulators and, generally, molded objects which possess such properties as low wear, great hardness, high resistance to attack by chemical agents, attractive appearance (either white or colored) and low coefficient of thermal expansion. The CaO range of from 4 to 9.6 percent by weight is particularly well-adapted to the formation of objects, e.g., plates, having large dimensions and being finely crystallized in a homogeneous manner throughout their entire masses.

The present invention will now be further described by reference to the following specific examples. It is to be understood that such examples are for purposes of illustration only and the present invention is in no way to be deemed as limited thereto.

EXAMPLE I

Glass ballotini of an average diameter of 80 microns were formed (by a method well known, per se) from glass of composition 1 (Table A).

The ballotini were then subjected to a two-stage heat treatment. In the first stage, the ballotini were heated to increase their temperature by 10°C per minute up to 760°C and that temperature was maintained for 30 minutes. In the second stage, the ballotini were further heated to increase their temperature by 5°C per minute, from 760°C to 1,110°C and their temperature was maintained for 1 hour. Then the ballotini were cooled in a controlled manner so that their temperature fell by 20°C per minute down to 700°C. Finally, cooling was completed in ambient air.

The devitrified glass beads produced were found to have excellent mechanical strength and exceptional utility for blasting.

EXAMPLE II

Glass ballotini with a mean diameter of 3 mm were made from glass of the following composition (the percentages being by weight):
  $SiO_2$ — 56.3 percent
  $Al_2O_3$ — 16.4 percent
  $CaO$ — 9.1 percent
  $MgO$ — 9.1 percent
  $TiO_2$ — 9.1 percent
  Softening point: — 780°C
  Temperature, at which the rate of crystal growth is maximum = 1,225°C.

Then the glass composing the ballotini was devitrified by the following heat treatment: In a first heating stage, the temperature of the ballotini was raised by 10°C per minute up to 750°C and that temperature was maintained for 2 hours. In a second heating stage, the temperature was increased by 5°C per minute from 750° up to 1,130°C and that temperature was maintained for 1 hour. The ballotini were then cooled. The cooling was initially controlled at 20°C per minute down to 700°C and the beads were then cooled in ambient air.

Here again, the devitrified beads were found to have excellent mechanical strength and exceptional utility for blasting, etc.

For optimum results it is particularly important that the second heating step or the second-stage heating be to a temperature which is less than, but within 100°C of, the temperature of maximum crystal growth speed. In this way the proportion of the crystalline phase in the devitrified product is from 60 to 80 percent by weight, the higher proportions being obtained as the final temperature of the second-stage heating approaches the temperature of maximum crystallization speed. When the second stage heating is only to a temperature which is more than 100°C below that of maximum crystallization speed, the proportion of the crystalline phase hardly exceeds 50 percent by weight. (Note treatment f in Table B.) There is actually a discontinuity in the crystalline phase proportion as the second heating step reaches 100°C below said temperature of maximum crystal growth speed.

EXAMPLE III

Glass beads of a diameter of 1.5 mm were made from glass of composition 11 (Table A).

The beads were devitrified by the following heat treatment: In a first heating stage, the temperature was increased by 10°C per minute up to 760°C and this temperature was maintained for 10 minutes. In a second heating stage, the temperature was increased by 5°C per minute from 760° up to 1,050°C and that temperature was maintained for one hour. Then the beads were cooled. The cooling was initially controlled at 20°C per minute down to 700°C and the cooling was then completed in ambient air.

Here again the devitrified beads were found to have excellent mechanical strength and exceptional utility for blasting, etc.

It will be understood that the above description of the present invention is susceptible to various modifications, changes and adaptations.

We claim:
1. Devitrified glass:
   A. possessing the following properties when in the form of beads:
      a. in excess of 50 kg/mm² resistance to deformation under load,
      b. a coefficient of linear thermal expansion of about $4.1 \times 10^{-6}$ per °C in the temperature range from 100° to 200°C,
      c. a density of from 2.5 to 2.8 gr/cm³,
      d. a Knoop hardness of at least 1,000 kg/mm²,
      e. an average crystal length of at most 20μ and
      f. in excess of 100 kg/mm² resistance to crushing;
   B. having a composition virtually free from lithium oxide and which, per 100 parts by weight, consists essentially of
      a. from 44 to 66 parts by weight of $SiO_2$,
      b. from 13 to 21 parts by weight of $Al_2O_3$,
      c. from 4 to 9.6 parts by weight of CaO,
      d. from 13 to 15 parts by weight of MgO,
      e. from zero to 10 parts by weight of at least one member selected from the group consisting of $Na_2O$ and $K_2O$,
      f. from zero to 15 parts by weight of $TiO_2$ and
      g. from zero to five parts by weight of $Cr_2O_3$;
   C. the sum of the parts by weight of $SiO_2$, $Al_2O_3$, CaO and MgO being at least 80, and the sum of the parts by weight of $Na_2O$, $K_2O$, $TiO_2$ and $Cr_2O_3$ being at most 20 and constituting the balance of said composition;

D. the ratio of the parts by weight of $SiO_2$ to the parts by weight of $Al_2O_3$ being from 3:1 to 3.5:1;

E. the ratio of the sum of the parts by weight of $SiO_2$ and $Al_2O_3$ to the sum of the parts by weight of CaO and MgO being from 2.3:1 to 4:1; and F. containing crystalline pbase in excess of 50 percent by weight, phase from $TiO_2$ and $Cr_2O_3$, of at least one of the following crystalline phases:
  a. α-crystobalite
  b. diopside
  c. anorthite,
  d. gellenite, and
  e. enstatite.

2. Devitrified glass according to claim 1, wherein the crystalline phase or phases constitute at least 55 percent by weight.

3. Devitrified glass according to claim 1 having from 14 to 18 parts by weight of $Al_2O_3$.

4. Devitrified glass according to claim 1 having therein at least one member selected from the group consisting of $Na_2O$ and $K_2O$.

5. Devitrified glass according to claim 1 having therein at least one member selected from the group consisting of $TiO_2$ and $Cr_2O_3$ as nucleating agent.

6. Devitrified glass according to claim 5 comprising $TiO_2$ as nucleating agent.

7. Devitrified glass according to claim 6 comprising from three to 15 parts by weight of $TiO_2$.

8. Devitrified glass according to claim 5 comprising $Cr_2O_3$ as nucleating agent.

9. Devitrified glass according to claim 8 comprising from five-tenths to five parts by weight of $Cr_2O_3$.

10. Devitrified glass according to claim 5 wherein the sum of the parts by weight of $SiO_2$, $Al_2O_3$, CaO and MgO is at least 95 parts by weight.

11. Divitrified glass according to claim 1 in the form of glass beads.

* * * * *